(12) United States Patent
Chen et al.

(10) Patent No.: US 12,134,144 B2
(45) Date of Patent: Nov. 5, 2024

(54) WELDING MARK INSPECTION METHOD AND APPARATUS, AND ELECTRONIC DEVICE

(71) Applicant: CONTEMPORARY AMPEREX TECHNOLOGY (HONG KONG) LIMITED, Hong Kong (CN)

(72) Inventors: Fei Chen, Ningde (CN); Guannan Jiang, Ningde (CN); Xiaoyi Chen, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/296,993

(22) Filed: Apr. 7, 2023

(65) Prior Publication Data
US 2024/0207980 A1 Jun. 27, 2024

Related U.S. Application Data

(63) Continuation of application No. PCT/CN2022/102728, filed on Jun. 30, 2022.

(51) Int. Cl.
*B23K 31/12* (2006.01)
*G06T 7/00* (2017.01)

(52) U.S. Cl.
CPC .......... *B23K 31/125* (2013.01); *G06T 7/0004* (2013.01)

(58) Field of Classification Search
CPC ............................ B23K 31/125; G06T 7/0004
See application file for complete search history.

(56) References Cited

U.S. PATENT DOCUMENTS

2021/0327043 A1\* 10/2021 Sakuramoto .......... G06T 7/0004
2022/0309764 A1 9/2022 Liu et al.

FOREIGN PATENT DOCUMENTS

| CN | 109187546 | A |   | 1/2019  |             |
|----|-----------|---|---|---------|-------------|
| CN | 111127571 | A |   | 5/2020  |             |
| CN | 111696108 | A | * | 9/2020  | ... G06K 9/342 |
| CN | 111951240 | A |   | 11/2020 |             |
| CN | 112183957 | A |   | 1/2021  |             |
| CN | 112285114 | A |   | 1/2021  |             |
| CN | 112465746 | A |   | 3/2021  |             |
| CN | 112730460 | A |   | 4/2021  |             |
| JP | H0833293  | A |   | 2/1996  |             |

OTHER PUBLICATIONS

The European Patent Office (EPO) Office Action for Application No. 22879634.8 Mar. 20, 2024 7 Pages.
The European Patent Office (EPO) The Extended European Search Report for Application No. 22879634.8 Jan. 8, 2024 9 Pages.

(Continued)

*Primary Examiner* — Jamil Ahmed
(74) *Attorney, Agent, or Firm* — ANOVA LAW GROUP, PLLC

(57) ABSTRACT

A welding mark inspection method includes acquiring a picture including a welding mark, and obtaining a classification type of the welding mark based on the picture and a welding mark classification model. The welding mark classification model is configured to classify the welding mark based on characteristics of the welding mark.

20 Claims, 5 Drawing Sheets

(56) References Cited

OTHER PUBLICATIONS

Essa Alghannam et al. "A novel method of using vision system and fuzzy logic for quality estimation of resistance spot welding." Symmetry 11.8 (2019): 990.

Linh Kastner et al. "Classification of spot-welded joints in laser thermography data using convolutional neural networks." Ieee Access 9 (2021): 48303-48312.

The World Intellectual Property Organization (WIPO) International Search Report and Written Opinion for PCT/CN2022/102728 Jan. 12, 2023 17 pages (including English translation).

* cited by examiner (a) (b)

(a) (b)

WELDING MARK INSPECTION METHOD AND APPARATUS, AND ELECTRONIC DEVICE

CROSS-REFERENCE TO RELATED APPLICATION

This application is a continuation of International Application No. PCT/CN2022/102728, filed on Jun. 30, 2022, the entire content of which is incorporated herein by reference.

TECHNICAL FIELD

This application relates to the field of battery technologies, and in particular, to a welding mark inspection method and apparatus, and an electronic device.

BACKGROUND

As time advances, electric vehicles have huge market prospects due to their high environmental friendliness, low noise, and low cost of use, and can effectively promote energy conservation and emission reduction, beneficial to the development and progress of society. For electric vehicles and related fields, battery technology is an important factor in connection with their development.

In each stage of the battery production process, each part of the batteries needs to be tested to ensure that the batteries are qualified in each production stage, so as to ensure that the finally produced batteries meet the quality requirements. How accuracy of the battery testing process is guaranteed is still an urgent problem to be resolved.

SUMMARY

This application provides a welding mark inspection method and apparatus, and an electronic device, which can avoid background interference during the welding mark inspection, and improve accuracy of welding mark classification, thereby lowering the overkill rate and underkill rate of the welding mark inspection.

According to a first aspect, a welding mark inspection method is provided, including: acquiring a first picture, where the first picture includes a welding mark; and obtaining a classification type of the welding mark based on the first picture and a welding mark classification model, where the welding mark classification model is used for classifying the welding mark based on characteristics of the welding mark.

The welding mark in the first picture is classified using the welding mark classification model, with no need to set a gray level threshold for the first picture. This can avoid misjudgment of the type of a welding mark caused by influence of a shooting position, a shooting device, or other factors on the gray level of the captured image in the case of judging the picture based on a same gray level threshold. In addition, using the welding mark classification model to analyze the data in the picture can improve the accuracy of classification results, thereby lowering the overkill rate and underkill rate of welding mark inspection.

In some embodiments, the characteristics of the welding mark include at least one of shape, color, or area of the welding mark.

Through processing based on the characteristics of the welding mark that can clearly distinguish acceptable welding marks from bad welding marks, the welding mark classification model can classify welding marks more accurately, thereby improving the accuracy of the classification results.

In some embodiments, the obtaining a classification type of the welding mark based on the first picture and a welding mark classification model includes: obtaining a first classification value based on the first picture and the welding mark classification model; and obtaining the classification type of the welding mark based on the first classification value.

The welding mark classification model may only process pictures and data, and the first classification value is associated with a specified classification type in subsequent processing. This can reduce the complexity of processing the data in the first picture by the welding mark classification model, and improve processing efficiency.

In some embodiments, the acquiring a first picture includes: acquiring a second picture, where the second picture includes a welding region in which the welding mark is located; and segmenting the first picture from the second picture based on the second picture and a welding mark segmentation model.

Segmenting the welding mark part from the second picture through the welding mark segmentation model facilitates extraction of the welding mark part for analysis. This avoids the impact of other regions in the picture on the classification type of the welding mark, thereby improving the accuracy of the welding mark classification.

In some embodiments, the welding mark segmentation model is used for segmenting the first picture from the second picture based on a boundary shape of the welding mark.

In this way, the welding region can be quickly determined without analyzing and processing each pixel, thereby improving segmentation efficiency and reducing data processing time.

In some embodiments, the acquiring a second picture includes: acquiring a third picture, where the third picture includes a surface region in which the welding region is located; and extracting the welding region in the third picture to obtain the second picture.

The welding region is extracted from the picture directly captured by the camera, which can narrow the inspection range, reduce processing time, and improve the inspection accuracy. In addition, the third picture can be acquired in a larger range. In a case that multiple objects need to be inspected, the number of shots can be reduced, and the number of industrial cameras configured can also be reduced, reducing the time for the product to be inspected to stay for photographing, and improving work efficiency.

In some embodiments, the classification type includes acceptable, burst point, or bad.

In this way, in a case that the welding mark is obviously acceptable or obviously bad, a classification result can be quickly obtained, and the inspection process can be ended, shortening the processing time of the welding mark inspection. In a case that the classification type is burst point, the welding mark can be further analyzed and inspected to improve the inspection accuracy and reduce the false inspection rate.

In some embodiments, the method further includes: in a case that the classification type of the welding mark is burst point, extracting a target region in the first picture, where the target region is a region with a sudden color change in the first picture; and determining the welding mark as acceptable or bad based on the target region.

A secondary inspection is performed on the welding mark that cannot be classified as acceptable or bad, so as to further classify such welding mark more accurately, thereby improving the accuracy of classification and lowering the overkill rate and underkill rate of the welding mark inspection. In addition, characteristics of smaller regions in the welding mark are further analyzed, so that the welding mark can be inspected at a higher accuracy, thereby improving the accuracy of the welding mark classification and reducing the false inspection rate.

In some embodiments, the determining the welding mark as acceptable or bad based on the target region includes: determining the type of the welding mark as acceptable or bad based on the target region and a region classification model.

The picture of the target region is analyzed and processed through the deep learning model, so that the welding mark classified as burst point can be further subdivided accurately. This classification method can improve the accuracy of the welding mark inspection, and avoid the influence of gray level deviation of the picture on the inspection results, thereby lowering the overkill rate and underkill rate.

In some embodiments, the region classification model is used for classifying the welding mark based on a shape of the target region.

Through processing based on the characteristics that can clearly distinguish the acceptable welding marks from the bad welding marks in the characteristics of the target region, the region classification model can more accurately identify the types of the welding marks, thereby avoiding the influence of gray level deviation of the target region on the classification results, and ensuring the accuracy of inspection.

In some embodiments, the determining the type of the welding mark as acceptable or bad based on the target region and a region classification model includes: obtaining a second classification value based on the target region and the region classification model; and determining the type of the welding mark as acceptable or bad based on the second classification value.

The second classification value is output by the region classification model, which can reduce complexity of data processing by the region classification model without affecting the processing accuracy, thereby improving the inspection efficiency.

In some embodiments, the extracting a target region in the first picture includes: obtaining the target region based on the first picture and a region segmentation model, where the region segmentation model is used for segmenting a region with a sudden color change in the first picture as the target region.

In this way, the target region can be accurately segmented from the first picture. This is conducive to determining of the classification of the welding mark based on the target region, and can avoid the influence of regions other than the target region on the inspection result, thereby improving the inspection accuracy.

In some embodiments, the determining the welding mark as acceptable or bad based on the target region includes: determining the welding mark as acceptable or bad based on a gray level and/or area of the target region.

This manner features simple calculation process, so that the welding marks classified as burst point can be subdivided quickly, so as to determine the welding marks as acceptable or bad.

In some embodiments, the determining the welding mark as acceptable or bad based on a gray level and/or area of the target region includes: in a case that the area of the target region is greater than or equal to a first threshold, or in a case that the gray level of the target region is greater than or equal to a second threshold, determining the type of the welding mark as bad; or in a case that the area of the target region is less than a first threshold and the gray level of the target region is less than a second threshold, determining the type of the welding mark as acceptable.

The condition of the target region is compared with the threshold, so that the classification type of the welding mark can be quickly determined as acceptable or bad, thereby improving the processing efficiency.

In some embodiments, the first classification value includes a first probability, a second probability, and a third probability, where the first probability is a probability that the classification type is acceptable, the second probability is a probability that the classification type is burst point, and the third probability is a probability that the classification type is bad; and the obtaining the classification type of the welding mark based on the first classification value includes: determining a classification type corresponding to the maximum value among the first probability, the second probability, and the third probability as the classification type of the welding mark.

In this way, in a case that the classification type of the welding mark in the first picture is similar to several types, the classification type of the welding mark can be determined more accurately, thereby reducing the possibility of misjudgment and lowering the overkill rate and underkill rate of the welding mark inspection.

In some embodiments, the welding mark is an anode welding mark, the welding mark classification model is a classification model for the anode welding mark, and the classification model for the anode welding mark is obtained by training data of the anode welding mark; or the welding mark is a cathode welding mark, the welding mark classification model is a classification model for the cathode welding mark, and the classification model for the cathode welding mark is obtained by training data of the cathode welding mark.

The welding mark classification models for inspecting the anode welding mark and the cathode welding mark are trained separately, so that the classification types of the welding marks can be obtained more accurately based on the characteristics of the anode or cathode welding marks, thereby improving the accuracy of welding mark inspection.

According to a second aspect, a welding mark inspection apparatus is provided, including: a processor and a memory, where the memory stores instructions, and when the instructions are executed by the processor, the apparatus is enabled to perform the method according to any one of the foregoing embodiments in the first aspect.

According to a third aspect, an electronic device is provided, including the welding mark inspection apparatus according to any one of the foregoing embodiments in the second aspect.

According to a fourth aspect, a computer-readable storage medium is provided, where the computer-readable storage medium stores a computer program, and when the computer program is executed, the method according to any one of the foregoing embodiments in the first aspect is implemented.

BRIEF DESCRIPTION OF DRAWINGS

To describe the technical solutions in the embodiments of this application more clearly, the following briefly describes the accompanying drawings required for describing the embodiments of this application. Apparently, the accompanying drawings in the following description show merely some embodiments of this application, and a person of ordinary skill in the art may still derive other drawings from the accompanying drawings without creative efforts.

Figure 1:
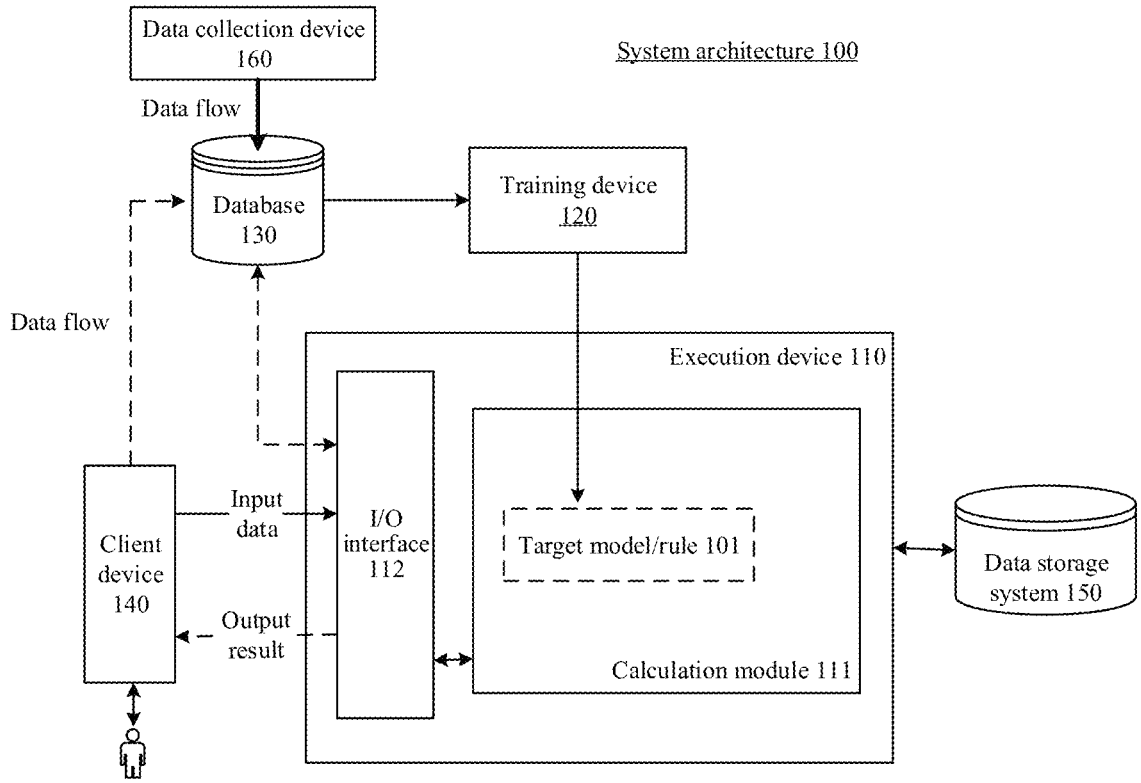
FIG. 1 is a schematic structural diagram of a system architecture according to an embodiment of this application.

The accompanying drawings are not drawn to scale.

DESCRIPTION OF EMBODIMENTS

The following further describes the implementations of this application in detail with reference to the accompanying drawings and embodiments. The detailed description of embodiments and the accompanying drawings are intended to illustrate the principle of this application, rather than to limit the scope of this application, meaning this application is not limited to the embodiments described herein.

In the description of this application, it should be noted that, unless otherwise stated, "a plurality of" means at least two; and the orientations or positional relationships indicated by the terms "upper", "lower", "left", "right", "inside", "outside", and the like are merely for ease and brevity of description of this application rather than indicating or implying that the apparatuses or components mentioned must have specific orientations or must be constructed or manipulated according to specific orientations. These terms shall therefore not be construed as limitations on this application. In addition, the terms "first", "second", and "third", and the like are merely for the purpose of description and shall not be understood as any indication or implication of relative importance. "Perpendicular" is not perpendicular in the strict sense but within an allowable range of error. "Parallel" is not parallel in the strict sense but within an allowable range of error.

The orientation terms appearing in the following description all refer to the orientations as shown in the drawings, and do not limit the specific structure of the application. In the descriptions of this application, it should be further noted that unless otherwise specified and defined explicitly, the terms "installment", "link", and "connection" should be understood in their general senses. For example, the terms may be a fixed connection, a detachable connection, or an integrated connection, or may be a direct connection, or an indirect connection through an intermediate medium. Persons of ordinary skill in the art can understand specific meanings of these terms in this application as appropriate to specific situations.

Reference to "embodiment" in this application means that specific features, structures, or characteristics described with reference to the embodiment may be included in at least one embodiment of this application. The word "embodiment" appearing in various places in the specification does not necessarily refer to the same embodiment or an independent or alternative embodiment that is exclusive of other embodiments. A person skilled in the art can clearly and implicitly understand that the embodiments described in this application can be combined with other embodiments.

During battery production, various members on the battery cell are usually connected by welding, and a welding mark produced during the welding is an important factor for examining welding quality. In an existing method for inspecting welding marks, usually an industrial camera is directly used to take pictures of a product to obtain image data, connected regions of different gray levels in the image are analyzed, and a specified gray level threshold is set to judge whether the welding mark in the image is acceptable or not. However, in the process of inspecting and determining the welding mark based on images, background in the images is likely to seriously interfere with division of a welding region. In scanning of the images for analysis, scanning accuracy also affects accuracy of extracting the welding mark. In addition, when pictures are taken at different positions by different devices, the gray levels of the pictures taken are easily affected. Using a same gray level threshold for determining the types of welding marks easily leads to misjudgment, so different thresholds need to be set to ensure accuracy of the inspection results.

Based on this, this application provides a welding mark inspection method. Pictures taken are input into a neural network model to classify a welding mark, so as to determine a type of the welding mark, thereby determining whether welding quality at a corresponding position on the product is acceptable. This welding mark inspection method can be free from background interference, and does not depend on adjustment of the gray level threshold, so that welding marks can be inspected and judged more accurately, thereby lowering the overkill rate and underkill rate of the welding mark inspection.

FIG. 1 is a schematic structural diagram of a system architecture to which an embodiment of this application is applicable. In FIG. 1, a data collection device 160 is configured to collect training data. After the training data is collected, the data collection device 160 stores the training data into a database 130, and a training device 120 performs training based on the training data maintained in the database 130 to obtain a target model/rule 101.

The target model/rule 101 can be used to implement the welding mark inspection method in this embodiment of this application, and may specifically be a neural network. It should be noted that, in actual application, the training data maintained in the database 130 is not necessarily all collected by the data collection device 160, and may be received from another device. In addition, it should be noted that the training device 120 trains the target model/rule 101 not necessarily all based on the training data maintained in the database 130, and may obtain training data from a cloud or another place to perform model training. The foregoing descriptions should not be construed as a limitation on this embodiment of this application.

The target model/rule 101 obtained by the training device 120 through training may be applied to different systems or devices, for example, applied to an execution device 110 in FIG. 1. The execution device 110 may be a terminal, for example, a mobile phone terminal, a tablet computer, or a notebook computer; or may be a server, a cloud, or the like. In FIG. 1, the execution device 110 configures an input/output (input/output, I/O) interface 112 configured to perform data interaction with an external device. A user can input data to the I/O interface 112 over a client device 140, where the input data in this embodiment of this application may include: a to-be-processed video or a to-be-processed image input by the client device 140.

In some implementations, the client device 140 and the foregoing execution device 110 may be a same device. For example, the client device 140 and the foregoing execution device 110 may both be a terminal device.

In some other implementations, the client device 140 and the foregoing execution device 110 may be different devices. For example, the client device 140 is a terminal device, and the execution device 110 is a cloud, a server, or another device. The client device 140 can interact with the execution device 110 through a communication network over any communication mechanism/communication standard. The communication network may be a wide area network, a local area network, a point-to-point connection, and the like, or any combination thereof.

A calculation module 111 in the execution device 110 is configured to process input data (such as the to-be-processed image) from the I/O interface 112. In a related processing procedure in which the calculation module 111 of the execution device 110 performs calculation, the execution device 110 may invoke data, code, and the like in a data storage system 150 to implement corresponding processing, and may also store, into the data storage system 150, data, an instruction, and the like obtained through corresponding processing.

Finally, the I/O interface 112 returns a processing result, such as an obtained result of the welding mark classification, to the client device 140, so as to provide the processing result to the user.

It should be noted that FIG. 1 is merely a schematic diagram of a system architecture according to an embodiment of this application. A location relationship between devices, components, modules, and the like shown in the figure constitutes no limitation. For example, in FIG. 1, the data storage system 150 is an external memory relative to the execution device 110. In another case, the data storage system 150 may be alternatively configured in the execution device 110.

As shown in FIG. 1, the training device 120 performs training to obtain the target model/rule 101, where the target model/rule 101 in this embodiment of this application can be a neural network. Specifically, the neural network in this embodiment of this application can be a CNN, a region convolutional neural network (region CNN, RCNN), a faster region convolutional neural network (faster RCNN), a neural network of another type, or the like. This is not specifically limited in this application.

Figure 2:
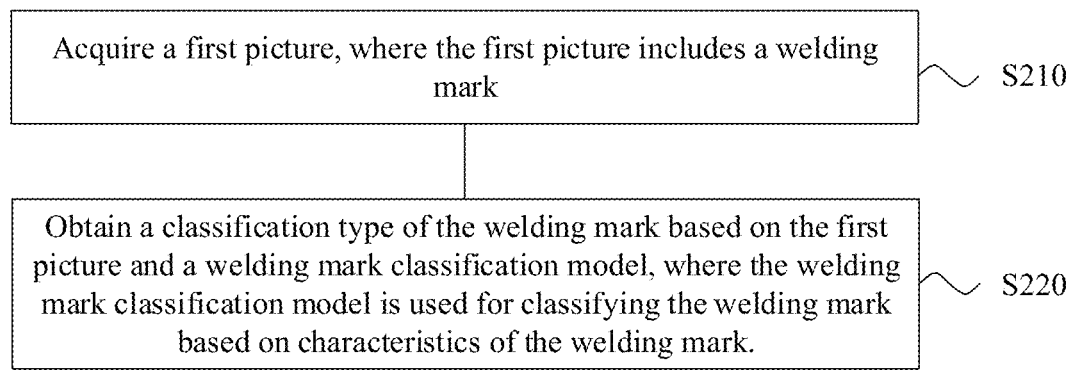
FIG. 2 is a schematic flowchart of a welding mark inspection method according to an embodiment of this application.

The following describes a welding mark inspection method 200 provided in this application in detail with reference to FIG. 2. FIG. 2 is a schematic flowchart of a welding mark inspection method according to an embodiment of this application. The method 200 can be performed by a welding mark inspection apparatus, and the apparatus may be the execution device 110 in FIG. 1. For ease of description, a part that needs welding in the battery production process is used as an example in this embodiment of this application for description. It should be understood that, the method in this embodiment of this application can also be used to inspect the welding mark in other scenarios. The method 200 may include at least some of the following content.

S210: The welding mark inspection apparatus acquires a first picture, where the first picture includes a welding mark.

S220: The welding mark inspection apparatus obtains a classification type of the welding mark based on the first picture and a welding mark classification model, where the welding mark classification model is used for classifying the welding mark based on characteristics of the welding mark.

The first picture may come from a picture obtained by photographing the welding mark produced in an actual production process, and the first picture includes at least the welding mark to be inspected. Taking the battery production process as an example, the welding mark may be a welding mark left at a place that needs welding in the battery production process, for example, a welding mark formed by welding a connection member and an electrode terminal of a battery cell. The first picture may also include a peripheral part of the welding mark. For example, for the welding mark produced by welding a connection member and an electrode terminal of a battery cell, the first picture may include a region of the entire electrode terminal, instead of including only the welded part on the electrode terminal. The first picture may also include other parts of the battery cell in a region where the welding mark is located, for example, periphery of the electrode terminal. In a possible implementation, the to-be-inspected welding mark occupies most part of the first picture, and the peripheral part or background part of the welding mark takes up a small proportion in the first picture.

The welding mark classification model is a model that classifies the welding mark in the first picture. The model may be, for example, a neural network. In a training process of the welding mark classification model, a first picture that has a known classification result can be input into the welding mark classification model, and the welding mark classification model analyzes and processes the first picture to obtain a first classification result. The first classification result is compared with the known classification result, and calculation parameters in the welding mark classification model are adjusted, so that the first classification result can match the known classification result. A large number of first pictures with known classification results are used to train the welding mark classification model, and the calculation parameters in the welding mark classification model are constantly adjusted, so that in a case that a first picture is input into the welding mark classification model, a classification result output by the welding mark classification model can match an actual welding mark type represented by the first picture. Within a specified error range, the classification result output by the welding mark classification model can be considered accurate.

In a process in which the welding mark classification model is used for classifying the first picture, the first picture with an unknown classification result is input into the welding mark classification model, and data of the first picture is analyzed and processed based on parameters determined during the model training, so as to obtain a classification type of the welding mark in the first picture. This classification type can be considered an accurate classification result in the specified error range.

During classification of the welding mark, characteristics of the welding mark are important factors for welding mark classification. The characteristics of the welding mark may be some physical properties of the welding mark, such as a shape, a color, and area of the welding mark. In the process of analyzing and processing the welding mark in the first picture, the welding mark classification model may extract the image of the welding mark in the first picture as data based on the characteristics of the welding mark, and then analyze and process the data. Welding mark regions in different welding situations can be distinguished based on the characteristics of the welding mark, thereby classifying the welding mark.

The welding mark in the first picture is classified using the welding mark classification model, with no need to set a gray level threshold for the first picture. This can avoid misjudgment of the type of a welding mark caused by influence of the shooting position, shooting device, or other factors on the gray level of the captured image in the case of judging the picture based on a same gray level threshold. In addition, using the welding mark classification model to analyze the data in the picture can improve the accuracy of classification results, thereby lowering the overkill rate and underkill rate of welding mark inspection.

According to some embodiments of this application, optionally, the characteristics of the welding mark include at least one of shape, color, or area of the welding mark.

Figure 3:
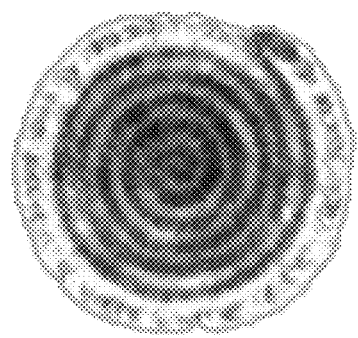
FIG. 3 is a schematic diagram of a first picture according to an embodiment of this application.
Figure 3:
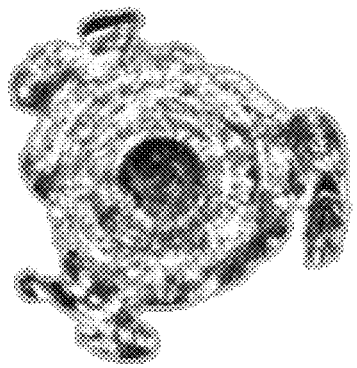

In this embodiment of this application, a welding mark formed by welding a cathode electrode terminal and a connection member, and a welding mark formed by welding an anode electrode terminal and the connection member are used as examples for description. As shown in FIG. 3, (a) in FIG. 3 shows a welding mark in an anode region, and (b) in FIG. 3 shows a welding mark in a cathode region.

It can be seen from FIG. 3 that, an acceptable anode welding mark is usually a relatively standard circle without many dark regions, and occupies some area of the anode electrode terminal; an acceptable cathode welding mark is usually a relatively standard circle with three separate bulges, without many dark regions, and occupying some area of the cathode electrode terminal. When the welding mark classification model is inspecting the anode welding mark or the cathode welding mark, the at least one of the shape, color, or area of the welding mark can be used as an inspection criterion to compare with an acceptable welding mark, so as to classify the welding mark.

It should be understood that, the shape, color and area can be used alone for judgment, or any of them can be combined for judgment. When some of them are combined for judgment, the welding mark can be classified as acceptable only when all of them satisfy the acceptable standard; and if any of them does not satisfy the acceptable standard, the welding mark cannot be classified as acceptable.

Through processing based on the characteristics of the welding mark that can clearly distinguish acceptable welding marks from bad welding marks, the welding mark classification model can classify welding marks more accurately, thereby improving the accuracy of the classification results.

According to some embodiments of this application, optionally, the welding mark inspection apparatus obtains a first classification value based on the first picture and the classification model, and obtains the classification type of the welding mark based on the first classification value.

The first classification value may be a result directly output by the welding mark classification model, that is, a result obtained by the welding mark classification model by converting information in the first picture into data and analyzing and processing the data. Different first classification values correspond to different classification types. After the first classification value is obtained, the first classification value may further correspond to a specified classification type in subsequent processing.

For example, the first classification value can be set to 0 or 1. The first classification value of 0 corresponds to the classification type of acceptable; and the first classification value of 1 corresponds to the classification type of bad. The welding mark classification model analyzes and processes the data extracted from the first picture to obtain the first classification value 0 or 1, and determines the classification type of the welding mark in the first picture according to the first classification value obtained.

Optionally, multiple first classification values may be set according to different classification types. For example, when three types are needed, the first classification value may be set as 0, 1, or 2, each corresponding to a different classification type.

The welding mark classification model may only process pictures and data, and the first classification value is associated with a specified classification type in subsequent processing. This can reduce the complexity of processing the data in the first picture by the welding mark classification model, and improve processing efficiency.

According to some embodiments of this application, optionally, the welding mark inspection apparatus acquires a second picture, where the second picture includes a welding region in which the welding mark is located; and segments the first picture from the second picture based on the second picture and a welding mark segmentation model.

Welding mark is a trace left by welding in a specified region. Therefore, during photographing of the welding mark, a picture taken may not include only the welding mark, and may include a peripheral region of the welding mark. In order to reduce interference of irrelevant regions on the welding mark classification, the second picture can be segmented using the welding mark segmentation model, to obtain the first picture containing the welding mark.

Figure 4:
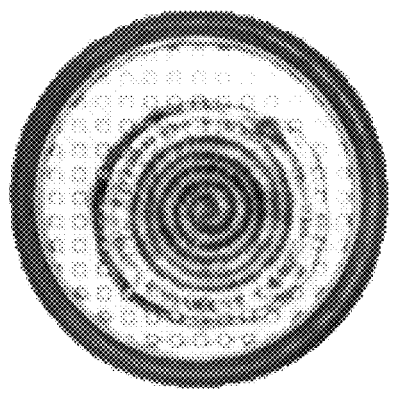
FIG. 4 is a schematic diagram of a second picture according to an embodiment of this application.
Figure 4:
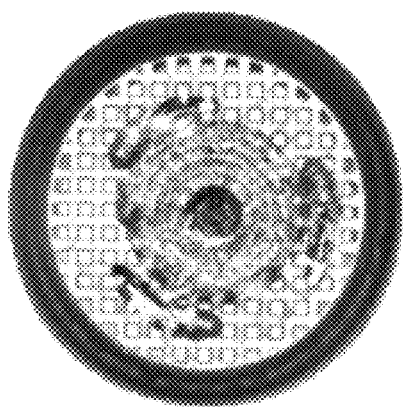

The second picture may come from a picture obtained by photographing a welding mark produced in an actual production process. For example, the second picture includes a welding mark and a peripheral region of the welding mark that are obtained by photographing, and the first picture is a picture obtained by inputting the second picture into the welding mark segmentation model and segmenting the welding mark alone therefrom. Taking FIG. 4 as an example, (a) in FIG. 4 is a picture of an anode electrode terminal, and part of the picture shows an anode welding mark; and (b) in FIG. 4 is a picture of a cathode electrode terminal, and part of the picture shows a cathode welding mark. Both (a) and (b) in FIG. 4 can be input into the welding mark segmentation model as second pictures, and first pictures obtained correspond to (a) and (b) in FIG. 3 respectively.

Segmenting the welding mark part from the second picture through the welding mark segmentation model facilitates extraction of the welding mark part for analysis. This avoids the impact of other regions in the picture on the classification type of the welding mark, thereby improving the accuracy of the welding mark classification.

According to some embodiments of this application, optionally, the welding mark segmentation model is used for segmenting the first picture from the second picture based on a boundary shape of the welding mark.

The welding mark segmentation model can segment the welding mark by using, for example, UNet semantic segmentation. The semantic segmentation can inspect each pixel and its surrounding pixels, and classify different pixels. For example, when the welding mark segmentation model analyzes a pixel and determines that the pixel is in the welding mark region, the pixel can be marked as 1; and if the pixel is in the peripheral region of the welding mark, the pixel can be marked as 0. In this way, the welding mark segmentation model can segment all pixels marked as 1 to obtain the first picture.

In a possible implementation, in the process of analyzing the pixels in the second picture, a relative position of a next possible pixel to a current pixel may be determined based on the boundary shape of the welding mark. For example, in a picture of anode electrode terminal, a next pixel to be inspected can be determined by assuming that a boundary shape of the welding mark is a circle.

In another possible implementation, while the welding mark segmentation model is analyzing the pixels, the number of pixels can be recorded and converted into area, so that the welding mark can be classified based on area of the obtained welding mark region, so as to determine whether the welding mark is acceptable or not. For example, area of an acceptable welding mark should be within a specified value range. When the area of the welding mark recorded in the welding mark segmentation model is not within this range, the welding mark can be directly considered as a bad welding mark. When the area of the welding mark recorded in the welding mark segmentation model falls within this range, other characteristics of the welding mark may be further inspected, so as to obtain a classification type of the welding mark.

In this way, the welding region can be quickly determined without analyzing and processing each pixel, thereby improving segmentation efficiency and reducing data processing time.

According to some embodiments of this application, optionally, the welding mark inspection apparatus acquires a third picture, where the third picture includes a surface region in which the welding region is located; and extracts the welding region in the third picture to obtain the second picture.

In actual production, multiple parts needing inspection can be photographed in one shot, that is, a picture can include multiple welding marks that need to be inspected. Specifically, a picture taken by the industrial camera may be the third picture, and the third picture may include a surface region in which the welding region is located. The surface region may be a plane in which the welding region is located, and there may be multiple welding regions on that plane. In a possible implementation, the camera may shoot in a direction perpendicular to a surface in which the welding region is located, to obtain the third picture. In this case, the third picture may include the welding region, for example, the anode electrode terminal, may also include a peripheral region of the welding region, and further optionally, may include another welding region, for example, the cathode electrode terminal.

In the process of extracting the welding region in the third picture, a region of interest (region of interest, ROI) in the third picture may be extracted, so as to narrow a range of the third picture that needs to be analyzed and processed. For example, if the third picture includes the anode electrode terminal, the cathode electrode terminal, and end surfaces on which the anode electrode terminal and the cathode electrode terminal are located, a welding region of the anode electrode terminal or cathode electrode terminal can be extracted from the third picture as the second picture for next data processing.

If no corresponding ROI is extracted from the third picture, it indicates that the third picture has no part to be inspected, and the inspection procedure can be directly ended.

The welding region is extracted from the picture directly captured by the camera, which can narrow the inspection range, reduce processing time, and improve the inspection accuracy. In addition, the third picture can be acquired in a larger range. In a case that multiple objects need to be inspected, the number of shots can be reduced, and the number of industrial cameras configured can also be reduced, reducing the time for the product to be inspected to stay for photographing, and improving work efficiency.

According to some embodiments of this application, optionally, the classification type includes acceptable, burst point, or bad.

In a possible implementation, a classification type of the welding mark can be classified into the foregoing three types. If the classification type is acceptable, it indicates that a product corresponding to the welding mark can enter the next production step. If the classification type is bad, it indicates that the product corresponding to the welding mark needs to be scrapped or returned to a previous production step for adjustment. If the classification type is burst point, it indicates that there is a part on the welding mark that may affect the welding quality, but whether the part has a substantial adverse effect on the product cannot be determined yet. In a case that the classification type of the welding mark is burst point, further judgment is needed.

In this way, in a case that the welding mark is obviously acceptable or obviously bad, a classification result can be quickly obtained, and the inspection process can be ended, shortening the processing time of the welding mark inspection. In a case that the classification type is burst point, the welding mark can be further analyzed and inspected to improve the inspection accuracy and reduce the false inspection rate.

According to some embodiments of this application, optionally, the method 200 further includes: in a case that the classification type of the welding mark is burst point, extracting, by the welding mark inspection apparatus, a target region in the first picture, where the target region is a region with a sudden color change in the first picture; and determining the welding mark as acceptable or bad based on the target region.

Figure 5:
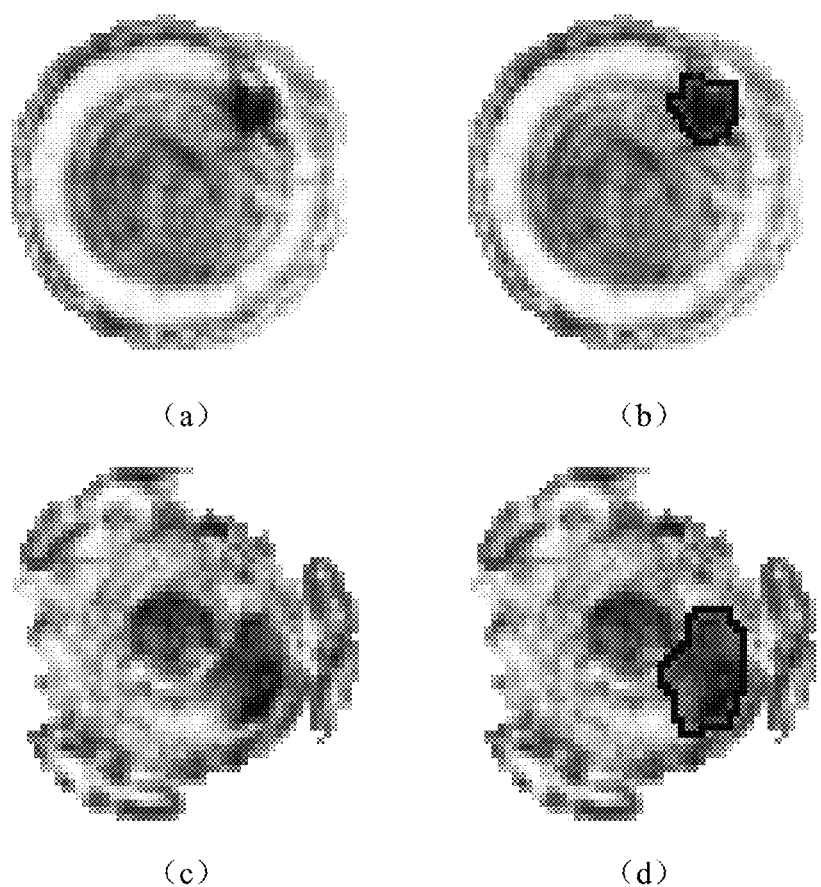
FIG. 5 is a schematic diagram of extracting a target region from a first picture according to an embodiment of this application.

As shown in FIG. 5, FIG. 5 is a schematic diagram of extracting a target region from a first picture. (a) in FIG. 5 is an anode welding mark, and the welding mark is classified as burst point. A region with a sudden color change in (a) is extracted to obtain a target region, that is, the part circled by the black solid line in (b). It should be understood that the black solid line in (b) is added only to indicate the target region, and the black solid line may not be displayed in actual processing. Similarly, (c) in FIG. 5 is a cathode solder print, and the welding mark is also classified as burst point. A region with a sudden color change in (c) is extracted to obtain a target region, that is, the part circled by the black solid line in (d). The target region is analyzed, so as to further inspect whether the welding mark has a substantial impact on the product, and further classify that welding mark of burst point type as acceptable or bad accordingly.

A secondary inspection is performed on the welding mark that cannot be classified as acceptable or bad, so as to further classify such welding mark more accurately, thereby improving the accuracy of classification and lowering the overkill rate and underkill rate of the welding mark inspection. In addition, characteristics of smaller regions in the welding mark are further analyzed, so that the welding mark can be inspected at a higher accuracy, thereby improving the accuracy of the welding mark classification and reducing the false inspection rate.

According to some embodiments of this application, optionally, the welding mark inspection apparatus determines the type of the welding mark as acceptable or bad based on the target region and a region classification model.

In the process of analyzing the target region, a neural network can be used to analyze the target region. Specifically, the region classification model may be trained for target region, and an extracted target region picture is input into the region classification model, so as to determine the classification type of the welding mark as acceptable or bad.

The picture of the target region is analyzed and processed through the deep learning model, so that the welding mark classified as burst point can be further subdivided accurately. This classification method can improve the accuracy of the welding mark inspection, and avoid the influence of gray level deviation of the picture on the inspection results, thereby lowering the overkill rate and underkill rate.

According to some embodiments of this application, optionally, the region classification model is used for classifying the welding mark based on characteristics of the target region.

In the process of classifying the welding mark by using the region classification model, the welding mark can be specifically classified based on characteristics of the target region. For example, the characteristics of the target region may be at least one of shape, color, or area.

For example, with respect to shape, whether the target region has a regular shape, is concentrated in a small region, has a narrow shape, or extends to a wide region, can each be used as a basis for classifying welding marks.

For example, with respect to color, the target region is a part with a sudden color change in the first picture, and the color shade of the target region can also be used as a basis for classifying welding marks.

For example, with respect to area, whether the area of the target region is within a specified threshold range can also be used as a basis for classifying welding marks. If the area of the target region is small and has little effect on the welding quality, the welding mark can be classified as acceptable; and if the area of the target region is large and the impact on the welding quality cannot be ignored, the welding mark can be classified as bad.

Through processing based on the characteristics that can clearly distinguish the acceptable welding marks from the bad welding marks in the characteristics of the target region, the region classification model can more accurately identify the types of the welding marks, thereby avoiding the influence of gray level deviation of the target region on the classification results, and ensuring the accuracy of inspection.

According to some embodiments of this application, optionally, the welding mark inspection apparatus obtains a second classification value based on the target region and a region classification model, and determines the type of the welding mark as acceptable or bad based on the second classification value.

The second classification value may be a result directly output after the region classification model processes the picture of the target region. Different second classification values correspond to different classification types. During welding mark inspection, a welding mark having a target region to be further analyzed and processed is a welding mark classified as burst point by the welding mark classification model. Therefore, in the process of inspecting the target region in such welding mark, only whether the welding mark is acceptable or bad needs to be determined. In this case, the second classification value may include two values: one corresponding to acceptable and the other corresponding to bad. The region classification model outputs one of the two values based on a data processing result, and then the second classification value is associated with a specified classification type in subsequent processing.

The second classification value is output by the region classification model, which can reduce complexity of data processing by the region classification model without affecting the processing accuracy, thereby improving the inspection efficiency.

According to some embodiments of this application, optionally, the welding mark inspection apparatus obtains the target region based on the first picture and a region segmentation model, where the region segmentation model is used for segmenting a region with a sudden color change in the first picture as the target region.

In the process of extracting the target region in the first picture, a deep learning model, namely a region segmentation model, may be used for segmenting the target region. The region segmentation model can segment the target region by using, for example, UNet semantic segmentation. The semantic segmentation can inspect each pixel and its surrounding pixels, and classify different pixels. Specifically, the region segmentation model may determine, by determining whether a pixel has a sudden color change as compared to at least some surrounding pixels, whether to classify the pixel as a pixel in the target region.

In this way, the target region can be accurately segmented from the first picture. This is conducive to determination of the classification of the welding mark based on the target region, and can avoid the influence of regions other than the target region on the inspection result, thereby improving the inspection accuracy.

According to some embodiments of this application, optionally, the welding mark inspection apparatus determines the welding mark as acceptable or bad based on a gray level and/or area of the target region.

In a possible implementation, the gray level and/or area of the target region may also be used as a basis for the welding mark inspection. For example, a connected component in the first picture may be extracted through blob analysis as a target region, a gray level of the target region is obtained, and a gray level threshold is set for the target region, so as to determine a welding mark in the first picture as acceptable or bad. Optionally, area of the target region may be obtained, and an area threshold is set for the target region, so as to determine the welding mark in the first picture as acceptable or bad.

This manner features simple calculation process, so that the welding marks classified as burst point can be subdivided quickly, so as to determine the welding marks as acceptable or bad.

According to some embodiments of this application, optionally, in a case that the area of the target region is greater than or equal to a first threshold, or in a case that the gray level of the target region is greater than or equal to a second threshold, the type of the welding mark is determined as bad; or in a case that the area of the target region is less than a first threshold, and the gray level of the target region is less than a second threshold, the type of the welding mark is determined as acceptable.

In the process of determining the type of the welding mark based on the area and gray level of the target region, thresholds may be set for area and gray level respectively. When either of the area the gray level does not fall within the acceptable threshold range, the type of the welding mark can be determined as bad. When both are within the acceptable threshold, the type of the welding mark can be determined as acceptable.

The condition of the target region is compared with the threshold, so that the classification type of the welding mark can be quickly determined as acceptable or bad, thereby improving the processing efficiency.

According to some embodiments of this application, optionally, the first classification value includes a first probability, a second probability, and a third probability, where the first probability is a probability that the classification type is acceptable, the second probability is a probability that the classification type is burst point, and the third probability is a probability that the classification type is bad. The classification type corresponding to the maximum value among the first probability, the second probability, and the third probability are determined as the classification type of the welding mark.

Results directly output by the welding mark classification model may alternatively be probability values corresponding to different classification types. In a case that three classification types of the welding mark are determined, the first classification value obtained through the welding mark classification model may include a first probability, a second probability, and a third probability. In a process in which the welding mark classification model analyzes and processes the first picture, the welding mark classification model separately calculates probabilities that the type of the welding mark in the first picture is acceptable, burst point, and bad. The three probabilities can indicate the probabilities of the welding mark being acceptable, burst point, or bad, and the most probable classification type is used as the classification type of the welding mark.

In this way, in a case that the classification type of the welding mark in the first picture is similar to several types, the classification type of the welding mark can be determined more accurately, thereby reducing the possibility of misjudgment and lowering the overkill rate and underkill rate of the welding mark inspection.

According to some embodiments of this application, optionally, the welding mark is an anode welding mark, the welding mark classification model is a classification model for anode welding mark, and the classification model for anode welding mark is obtained by training data of anode welding marks; or the welding mark is a cathode welding mark, the welding mark classification model is a classification model for cathode welding mark, and the classification model for cathode welding mark is obtained by training data of cathode welding marks.

It can be seen from FIG. 3 to FIG. 5 that the anode welding mark and the cathode welding mark differ greatly in shape, and how classification types of the anode welding mark and cathode welding mark are determined also differs greatly. Therefore, the anode welding mark and the cathode welding mark can be separately inspected. In a possible implementation, the welding mark classification model is trained using data of anode welding marks, for example, anode welding mark pictures, to obtain a classification model for anode welding mark; and then a classification type of the anode welding mark is obtained using the classification model for anode welding mark. Similarly, the welding mark classification model is trained using data of cathode welding marks, for example, cathode welding mark pictures, to obtain a classification model for cathode welding mark; and then a classification type of the cathode welding mark is obtained using the classification model for cathode welding mark.

The welding mark classification models for inspecting the anode welding mark and the cathode welding mark are trained separately, so that the classification types of the welding marks can be obtained more accurately based on the characteristics of the anode or cathode welding marks, thereby improving the accuracy of welding mark inspection.

Figure 6:
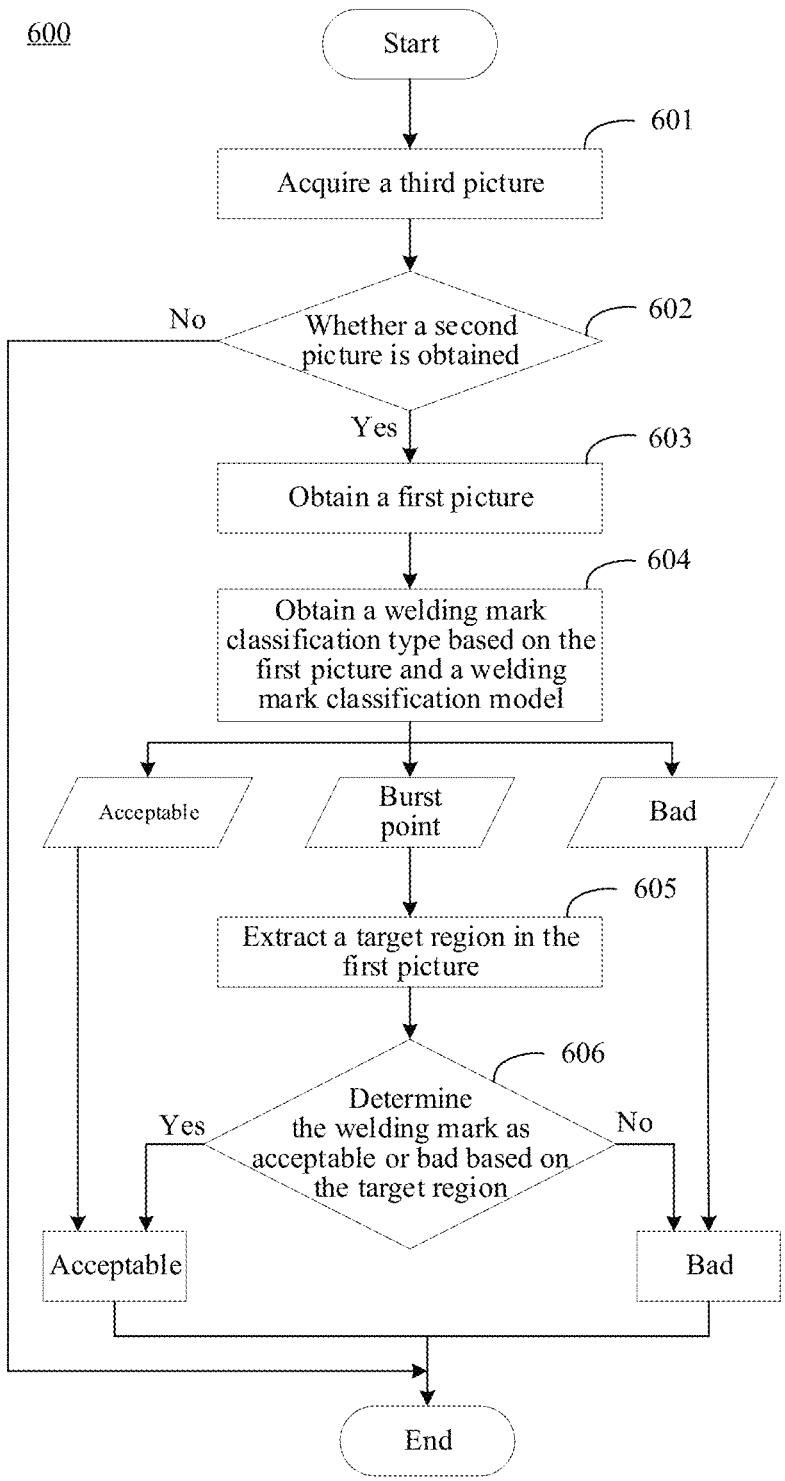
FIG. 6 is a schematic flowchart of another welding mark inspection method according to an embodiment of this application.

In another optional implementation, the welding mark inspection method in this embodiment of this application may include a process 600 shown in FIG. 6, where the process 600 may include at least some of the following content.

601. A welding mark inspection apparatus acquires a third picture. For example, the third picture may be a picture directly taken by an industrial camera.

602. Detect for a region of interest in the third picture to determine whether there is a region of interest in the third picture, that is, whether the third picture includes a welding mark that needs inspection. If yes, extract the region of interest from the third picture as the second picture, and perform subsequent processing; if no, end the process. The second picture may include a welding region in which the welding mark is located.

603. Acquire a first picture. For example, the first picture may be obtained from the second picture. In a possible implementation, the welding mark inspection apparatus may segment the welding mark from the second picture by using UNet semantic segmentation, so as to obtain the first picture.

604. Obtain a classification type of the welding mark based on the first picture and a welding mark classification model. Specifically, the first picture is input into the welding mark classification model, and the first picture is analyzed and processed using the trained model so as to obtain the classification type of the welding mark. The classification type obtained using the welding mark classification model may be acceptable, burst point, or bad. In a case that the welding mark is classified as acceptable or bad, the result can be used as the final classification result of the welding mark, and the process ends. In a case that the welding mark is classified as burst point, the welding mark can be further analyzed.

605. In a case that the welding mark in the first picture is classified as burst point, extract a target region in the first picture. The target region may be a part in the first picture that may affect welding quality, for example, a region with sudden color change in the first picture.

606. Analyze the target region to determine the final classification type of the welding mark as acceptable or bad. Optionally, the target region can be analyzed by using a region classification model or setting a gray level threshold, so as to obtain the classification type of the welding mark.

According to the welding mark inspection method provided in this embodiment of this application, the welding mark is obtained through segmentation, so that the welding mark inspection process can be free from background interference, thereby improving accuracy of welding mark classification. In addition, a deep learning model is used for classifying the welding mark, without relying on adjustment of the gray level threshold, making classification of the welding mark more accurate. Moreover, further inspection on a welding mark that cannot be directly classified as acceptable or bad allows inspection of the welding mark at a higher accuracy while reducing the data processing workload of the welding mark inspection apparatus, thereby improving inspection efficiency.

Figure 7:
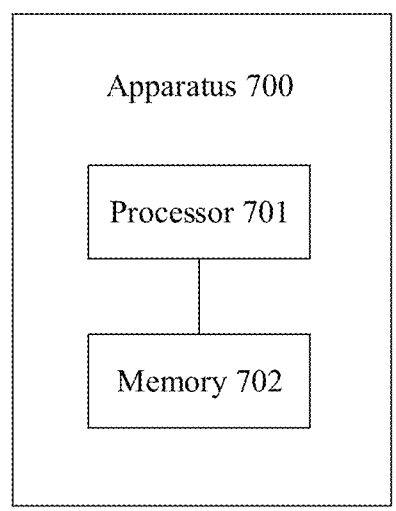
FIG. 7 is a schematic diagram of a welding mark inspection apparatus according to an embodiment of this application.

This application further provides a welding mark inspection apparatus 700. As shown in FIG. 7, the apparatus 700 includes a processor 701 and a memory 702, where the memory 702 stores instructions, and when the instructions are executed by the processor 701, the apparatus 700 is enabled to perform the method according to any one of the foregoing embodiments.

This application further provides an electronic device including the welding mark inspection apparatus 700 according to the foregoing embodiment.

This application further provides a computer-readable storage medium. The computer-readable storage medium stores a computer program, and when the computer program is executed, the method according to any one of the foregoing embodiments is implemented.

Although this application has been described with reference to some embodiments, various modifications can be made to this application without departing from the scope of this application and the components therein can be replaced with equivalents. In particular, as long as there is no structural conflict, the various technical features mentioned in the embodiments can be combined in any manners. This application is not limited to the specific embodiments disclosed in this specification, but includes all technical solutions falling within the scope of the claims.

What is claimed is:

1. A welding mark inspection method, comprising:
    acquiring a picture, wherein the picture comprises a welding mark; and
    obtaining a classification type of the welding mark based on the picture and a welding mark classification model, wherein the welding mark classification model is configured to classify the welding mark based on characteristics of the welding mark, and obtaining the classification type of the welding mark based on the picture and the welding mark classification model comprises:
        in response to the welding mark being an anode welding mark, obtaining the classification type of the anode welding mark based on the picture and a welding mark classification model for the anode welding mark; and
        in response to the welding mark being a cathode welding mark, obtaining the classification type of the cathode welding mark based on the picture and a welding mark classification model for the cathode welding mark, the welding mark classification model for the cathode welding mark being different from the welding mark classification model for the anode welding mark.

2. The method according to claim 1, wherein the characteristics of the welding mark comprise at least one of shape, color, or area of the welding mark.

3. The method according to claim 1, wherein obtaining the classification type of the welding mark based on the picture and the welding mark classification model further comprises:
    obtaining a classification value based on the picture and the welding mark classification model; and
    obtaining the classification type of the welding mark based on the classification value.

4. The method according to claim 3, wherein:
    the classification value comprises a first probability, a second probability, and a third probability, wherein the first probability is a probability of the classification type being acceptable, the second probability is a probability of the classification type being burst point, and the third probability is a probability of the classification type being bad; and
    obtaining the classification type of the welding mark based on the classification value comprises:
        determining a classification type corresponding to a maximum value among the first probability, the second probability, and the third probability as the classification type of the welding mark.

5. The method according to claim 1, wherein:
    the picture is a first picture; and
    acquiring the first picture comprises:
        acquiring a second picture, wherein the second picture comprises a welding region in which the welding mark is located; and
        segmenting the first picture from the second picture based on the second picture and a welding mark segmentation model.

6. The method according to claim 5, wherein the welding mark segmentation model is configured to segment the first picture from the second picture based on a boundary shape of the welding mark.

7. The method according to claim 5, wherein acquiring the second picture comprises:
    acquiring a third picture, wherein the third picture comprises a surface region in which the welding region is located; and
    extracting the welding region in the third picture to obtain the second picture.

8. The method according to claim 1, wherein the classification type comprises acceptable, burst point, or bad.

9. The method according to claim 8, further comprising, in a case that the classification type of the welding mark is burst point:
    extracting a target region in the picture, wherein the target region is a region with a sudden color change in the picture; and
    determining the welding mark as acceptable or bad based on the target region.

10. The method according to claim 9, wherein determining the welding mark as acceptable or bad based on the target region comprises:
    determining the welding mark as acceptable or bad based on the target region and a region classification model.

11. The method according to claim 10, wherein the region classification model is configured to classify the welding mark based on characteristics of the target region.

12. The method according to claim 10, wherein determining the welding mark as acceptable or bad based on the target region and the region classification model comprises:
    obtaining a classification value based on the target region and the region classification model; and
    determining the welding mark as acceptable or bad based on the classification value.

13. The method according to claim 9, wherein extracting the target region in the picture comprises:
    obtaining the target region based on the picture and a region segmentation model, wherein the region segmentation model is configured to segment a region with a sudden color change in the picture as the target region.

14. The method according to claim 9, wherein determining the welding mark as acceptable or bad based on the target region comprises:
    determining the welding mark as acceptable or bad based on at least one of a gray level or an area of the target region.

15. The method according to claim 14, wherein determining the welding mark as acceptable or bad based on the at least one of the gray level or the area of the target region comprises:

in a case that the area of the target region is greater than or equal to a first threshold, or in a case that the gray level of the target region is greater than or equal to a second threshold, determining the welding mark as bad; or in a case that the area of the target region is less than the first threshold and the gray level of the target region is less than the second threshold, determining the welding mark as acceptable.

16. A welding mark inspection apparatus, comprising:
a processor; and
a memory storing instructions that, when executed by the processor, cause the processor to:
  acquire a picture, wherein the picture comprises a welding mark; and
  obtain a classification type of the welding mark based on the picture and a welding mark classification model, wherein the welding mark classification model is configured to classify the welding mark based on characteristics of the welding mark, and obtaining the classification type of the welding mark based on the picture and the welding mark classification model comprises:
    in response to the welding mark being an anode welding mark, obtaining the classification type of the anode welding mark based on the picture and a welding mark classification model for the anode welding mark; and
    in response to the welding mark being a cathode welding mark, obtaining the classification type of the cathode welding mark based on the picture and a welding mark classification model for the cathode welding mark, the welding mark classification model for the cathode welding mark being different from the welding mark classification model for the anode welding mark.

17. The apparatus according to claim 16, wherein the characteristics of the welding mark comprise at least one of shape, color, or area of the welding mark.

18. The apparatus according to claim 16, wherein the instructions further cause the processor to obtain the classification type of the welding mark based on the picture and the welding mark classification model by:
  obtaining a classification value based on the picture and the welding mark classification model; and
  obtaining the classification type of the welding mark based on the classification value.

19. An electronic device, comprising:
the welding mark inspection apparatus according to claim 17.

20. A welding mark inspection method, comprising:
acquiring a picture, wherein the picture comprises a welding mark; and
obtaining a classification type of the welding mark based on the picture and a welding mark classification model, wherein the welding mark classification model is configured to classify the welding mark based on characteristics of the welding mark, and obtaining the classification type of the welding mark based on the picture and the welding mark classification model comprises:
  obtaining a classification value based on the picture and the welding mark classification model, wherein the classification value comprises a first probability, a second probability, and a third probability, the first probability is a probability of the classification type being acceptable, the second probability is a probability of the classification type being burst point, and the third probability is a probability of the classification type being bad; and
  obtaining the classification type of the welding mark based on the classification value comprising:
    determining a classification type corresponding to a maximum value among the first probability, the second probability, and the third probability as the classification type of the welding mark.

* * * * *